June 15, 1965

T. J. MELSKY 3,189,022

METHOD AND APPARATUS FOR PREMELTING THERMOPLASTIC ADHESIVE MATERIALS

Filed July 26, 1963

Inventor
Thomas J. Melsky
By
Attorney

United States Patent Office 3,189,022
Patented June 15, 1965

3,189,022
METHOD AND APPARATUS FOR PREMELTING THERMOPLASTIC ADHESIVE MATERIALS
Thomas J. Melsky, 90 Roseen Road, Holbrook, Mass.
Filed July 26, 1963, Ser. No. 297,850
4 Claims. (Cl. 126—343.5)

This invention relates, in general, to a method and apparatus for handling thermoplastic materials of the class commonly referred to as "hot melt" adhesives. Materials of this type consist of thermoplastic polymers and include compounds of resins, waxes and plasticisers and ordinarily occur in a solid state at room temperatures. It is customary to subject these hot melt adhesives to temperatures in a range of from 150° F. to 500° F. to liquify or melt the solid material in which form hot application of adhesive may be advantageously carried out utilizing various applicator devices well-known in the art.

In one specific aspect the invention is concerned with a novel technique and means for premelting the hot melt adhesive and constantly maintaining the liquid or melted material within a precise range of temperatures to provide a reservoir from which required amounts of adhesive may be supplied to a suitable applicator device in a satisfactory manner.

In some types of hot melt application considerable difficulty is experienced in connection with heating the hot melt adhesive satisfactorily in the relatively high temperature ranges indicated. For example, excessive heating may result in charring of the resin components in the adhesive, or loss of some of the desired adhesive ability of the product, or interference with free flow and application. This is particularly the case where the hot melt is required to be held at elevated temperatures for extended periods. For example, an adhesive which can undergo heating at substantially high temperatures for a short interval of time without difficulty may, if held for longer periods, be permanently damaged and lose much of its desirable bonding characteristics. It should also be understood that in the case of some hot melt adhesives, maximum bonding is only realized by maintaining the hot melt at very precise temperature values without being affected by changes in ambient temperature occuring from time to time.

It is, therefore, a chief object of the present invention to provide an improved method and apparatus for premelting hot melt adhesives whereby the above-noted difficulties may be overcome or substantially minimized and a more satisfactory and efficient application of hot melt realized in the range of temperatures as noted.

I have determined that these objectives may be realized to a very desirable degree by a novel technique which I refer to as "laminar flow heating." In carrying out this laminar flow heating method, a desired quantity of hot melt adhesive is contained in a hopper and subjected to heat from two different sources. At the bottom of the hopper there is provided a dispensing outlet and a restricted elongated passageway of crescent shaped cross section communicating with the outlet. In this restricted crescent shaped passageway a portion of melted adhesive is constantly confined in a thin layer or crescent shaped laminar body at points closely adjacent to the dispensing outlet and all premelted material which is dispensed through the outlet is, therefore, caused to occur as a thin crescent shaped laminar body which is highly sensitive to heat changes and which can be maintained within a very narrow range of temperatures by means of suitable heat sensing probe means. It will be apparent that when a desired quantity of hot melt is to be released through an applicator head, there occurs a laminar flow of the hot melt and a very precise heat sensing may be carried out with respect to melted material leaving the hopper through the outlet.

I have also found that a thin crescent shaped laminar body of melted adhesive, if subjected to heat released from two heating surfaces between which the laminar body is contained, becomes very sensitive to small changes in temperature and it becomes possible to detect, very quickly, variations in temperature and to increase or decrease heating. Thus a highly precise and delicate control of the premelted material may be realized at all times irrespective of changes in ambient temperature or other conditions.

I further find that by means of this precise temperature control, it becomes practical to maintain a quantity of melted adhesive at one point at a temperature somewhat below the temperature required for optimum bonding. Temperatures may then be increased at another point with less risk when it becomes necessary to deliver the premelted material through an applicator head. Since heating may thus be carried out more effectively in several stages, the danger of excessive heating, or prolonged heating prior to the point at which the material is actually applied, is greatly minimized.

The general nature of the invention and its other objects and novel features will be more fully understood and appreciated from the following description of a preferred embodiment of the invention selected for purposes of illustration and shown in the accompanying drawings, in which.

The method of the invention is, in general, concerned with liquifying any of the well-known hot melt adhesives commonly manufactured and sold and the heating means employed, as hereinafter disclosed, is designed to be used with any one of various types of applicator devices known to the art such as, for example, the hot melt applicators commonly manufactured and sold by such companies as Stein Hall Company of New York, New York; National Starch and Chemical Corporation, Chicago, Illinois and Acumelt Corporation of Wellesley, Massachusetts.

In using premelted adhesive with the applicator devices noted, it is further customary to supply the liquified material through a suitable conduit and to keep the liquified material heated to as nearly constant temperature as possible while the liquid material is being forced through the applicator head by pumping pressure. This is done in various well-known ways as by heating the conduit, using electrical heating means, or by surrounding the conduit with a second tubular body through which hot fluids or gases may be circulated.

Figure 3:
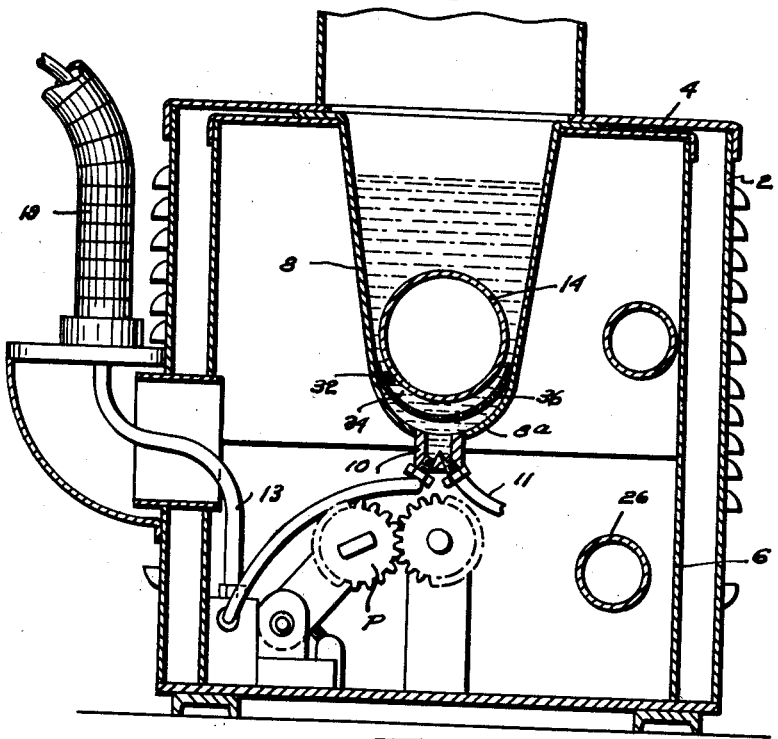
FIGURE 3 is a cross sectional view taken transversely of the apparatus shown in FIGURE 1 and further illustrating means for producing a laminar flow of hot melt at a point closely adjacent to a dispensing outlet in the hopper.
Figure 4:
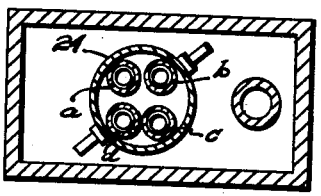
FIGURE 4 is a cross sectional view of one preferred form of heating element.
Figure 5:
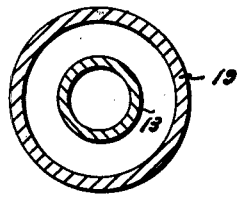
FIGURE 5 is a cross sectional view of conduit means for conducting melted material to a point of application.

Considering in greater detail the apparatus of the invention, I provide a special hopper arrangement for carrying out laminar flow heating. As shown in the drawings, numeral 2 denotes an outer cabinet member which is closed at its upper side by a cover portion 4 as indicated in FIGURE 3. An inner wall portion 6 defines an enclosed volume which constitutes a heating oven and supported in the oven, from the upper side of cabinet 2, is a depending elongated hopper 8 for receiving hot melt material.

The hopper 8 is shaped with elongated downwardly converging sides which meet to form a curved bottom section 8a whose arc of curvature is relatively small as noted in FIGURE 3. Connected into this curved bottom section 8a, at an intermediate point therealong, is a dispensing outlet 10 which is designed to supply fluid hot melt to a flexible conduit as controlled by a pumping mechanism hereinafter described in detail.

Mounted horizontally of the hopper structure 8, and in sealed relationship thereto, is a tubular conduit 14 of relatively small diameter. The bottom of the tubular member 14 is located in very close proximity to the bottom section 8a to define a passageway of crescent shaped cross section extending all along the bottom of the hopper as shown in FIGURE 3 and communicating with the outlet 10.

By means of this arrangement it will be seen that a relatively large mass of adhesive may be contained in the upper section of the hopper and a relatively small mass of melted material in the form of a thin crescent shaped laminar body will necessarily be confined at the bottom of the hopper between this member and the tubular member 14. Thus any melted material passing out through the discharge outlet 10 must flow as a thin laminar body which may be constantly subjected to heating from two relatively large surfaces when the tubular member and hopper are exposed to heat.

It is intended that the entire inner surface of the casing 6 may be covered with a layer of insulating material to aid in holding heat within the cabinet and it will also be observed that the position of the tubular member 14, relative to the bottom section 8a may, if desired, be varied to change the spacing of this member with respect to the bottom of the hopper.

Figure 1:
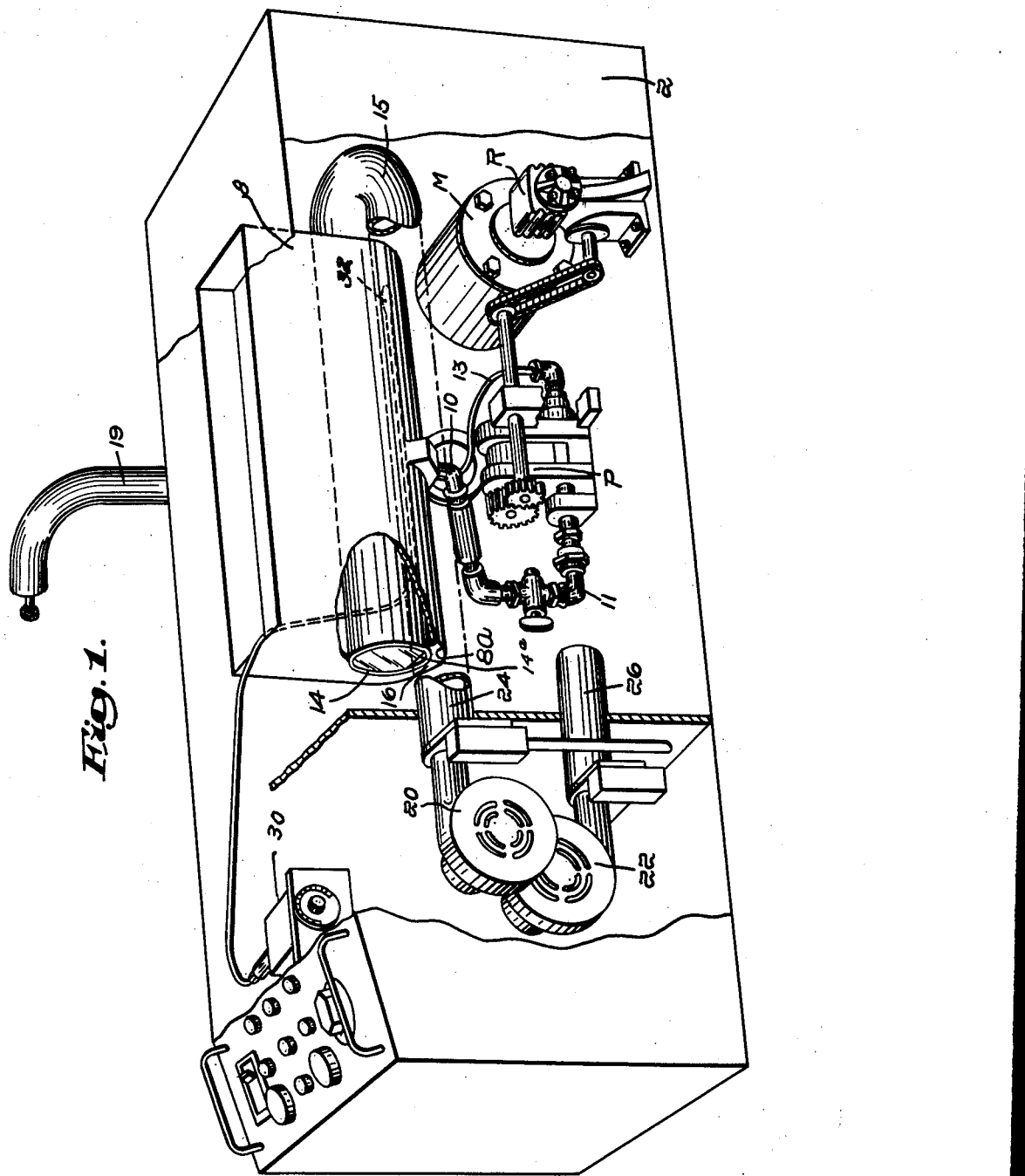
FIGURE 1 is a perspective view partly broken away to show the apparatus of the invention with the hopper member supported therein.

Heat may be supplied in any desirable manner and in one preferred embodiment may consist of two heat sources for furnishing two independently directed flows of hot fluid body such as hot air. As shown in FIGURE 1, numerals 20 and 22 denote two air-blower members of conventional air-blower type which are supported at one end of the casing 6 in some convenient manner as suggested in FIGURE 1. These air-blower members, 20 and 22, are arranged to move a current of air through tubular members as 24 and 26 and mounted in the tubular members 24 and 26 are conventional electrical heating coils.

These heating coils may, for example, consist of conventional resistance wire heaters which, in one well-known form, include four coils of wire as indicated at a, b, c and d. The coils a, b, c and d, may be of any desired length to provide a required amount of heating and are preferably designed to provide for heating in the spaces noted in a range of temperatures of from 100° F. up to 500° F.

Figure 2:
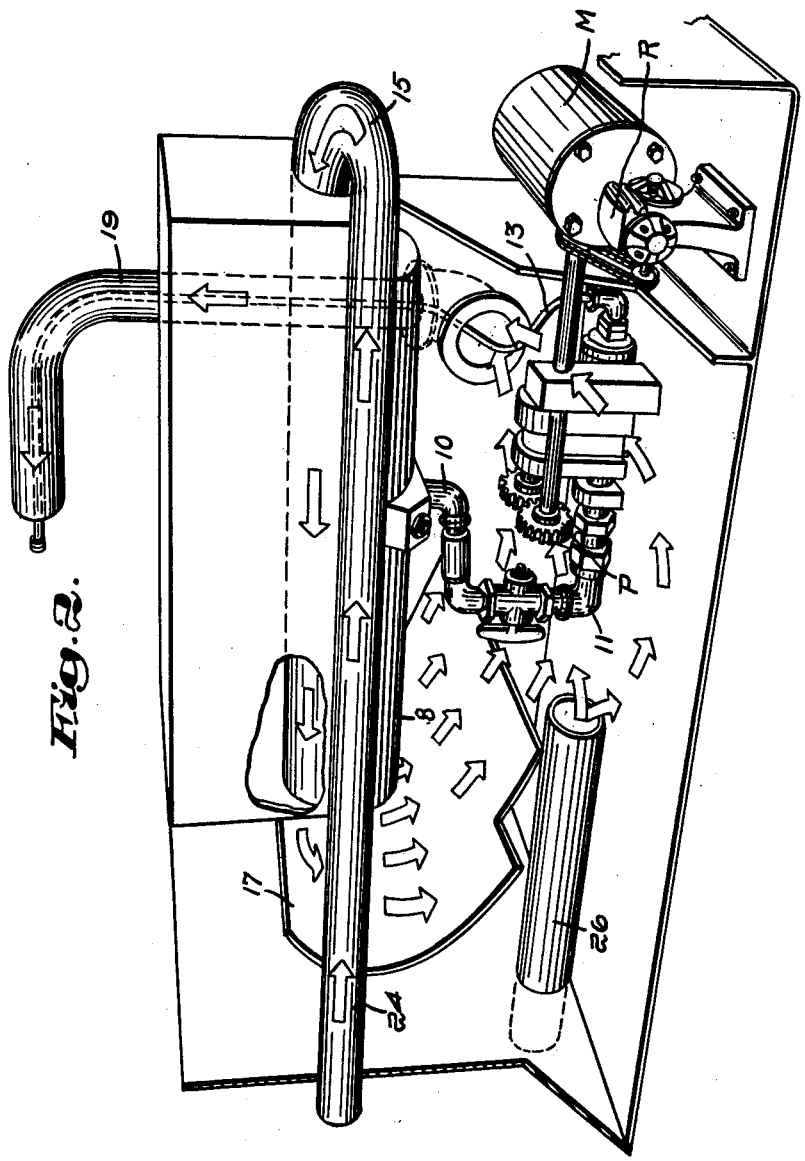
FIGURE 2 is another perspective view illustrating a portion of the heating chamber and the hopper structure shown in FIGURE 1 but viewed from a different angle.

The tubular member 26 is of a relatively short length and functions to supply heat to a pump mechanism P located in the bottom of the cabinet. The mechanism P may preferably consist of a metering gear pump of a well-known type such as that manufactured by the Zenith Products Company of West Newton, Massachusetts. This pump is driven by a motor M through a gear reducer R as shown in FIGURES 1 and 2.

Hot melt from the outlet 10 is drawn by pump P through pipe 11 and then forced through feedline 13 to an adhesive applicator head of some desired type earlier indicated and not shown in the drawings. Heated air flow from member 26 is circulated directly into contact with the bottom of the hopper 8 and also around the pumping mechanism P while pumping takes place in order to maintain the various conduit and pump portions in a properly heated state at all times when hot melt is being supplied to the applicator device. Similarly, hot air from the heating tube 24 passes along one side of the hopper and through a U-shaped conduit portion 15 which is connected to one end of the tubular member 14. A current of hot air thus travels in the directions indicated by the arrows in FIGURE 2.

At one extremity of the tubular member 14, nearest to the heating tube 24, an opening 14a is provided to permit an out-flow of hot air into the oven area and into contact with a baffle 17. This deflects the current of hot air from member 14 downwardly and back towards the pumping mechanism P to augment the heating capacity of the heating unit 26.

Portions of the heated air in the heating oven area thus circulated through and around the bottom of the hopper are led out of the oven through a tubular conduit 19 which is connected into one side of the oven and which surrounds the outlet extension pipe 13. Conduit 19 is of a larger diameter so as to provide for a concentric flow of hot air around the adhesive as it passes along the pipe 13 to an applicator head. This arrangement is representative of various concentric flow heating means and, as noted above, may conduct other heating mediums such as hot oil and other liquids.

The flow of hot gas through the heating tubes 24 and 26 may, in accordance with the invention, be controlled by means of an electrical control switch apparatus which is indicated by numeral 30 and which is located at an upper side of the cabinet. This switch controls operation of the heating coils in the tubes 24 and 26 and is responsive to a heat sensing probe 32 which is located between the tubular member 14 and the hopper in the laminar body portion 34 as shown in FIGURE 3 and in closed proximity to the screen element 36.

It is contemplated that the heat sensing probe 32 may be moved into varying positions along the laminar body portion 34 and it is pointed out that in a position such as that indicated in the drawings a very precise determination of temperatures of melted material leaving outlet 13 may be made. Moreover, the laminar body portion 34, because it is relatively thin, increases in temperature very rapidly when receiving heat from both the member 14 and the hopper. Because of these conditions the temperature of the laminar body may be kept within a very narrow predetermined range of temperatures by means of the heat sensing probe and by regulating the flow of hot gases in response to the probe, preferably through intermittent operation of the electrical heating coils to periodically furnish additional amounts of heat from time to time to keep a substantially constant temperature value.

An important feature of this laminar flow heating method described is the technique of heating in two or more stages. Since the temperature of the laminar body may be raised very quickly when desired, it is feasible to hold the liquid material at a temperature lower than is ordinarily the case and quickly raise the temperature when desired. The greater latitude in controlling temperature of material occurring as a laminar body makes it practical to utilize heating at other points such as in the outlet conduit 19 and in the application head with the result that combined heating at several stages may be most advantageously employed with various classes of the hot melt adhesives.

The method and apparatus of the invention may be practiced in other forms. For example, I may desire to utilize other heating means as hot liquids in place of hot air, also I may employ electrical heating units, including those of high frequency type and others. I may also wish to vary the shape and construction of the hopper member and I may provide for laminar flow between two heating surfaces which are parallel to one another rather than being annularly spaced apart.

While I have shown and disclosed preferred embodiments of the invention, various other changes and modi-

I claim:

1. In a method of premelting a hot melt adhesive in which the hot melt adhesive is heated to form a liquified adhesive reservoir and portions of the liquified adhesive are furnished to a hot melt adhesive applicator the steps which include, supporting a mass of said hot melt adhesive with a hopper and around a heating duct supported in separated relationship to the bottom of the hopper to form a narrow passageway of crescent shaped cross section thereto, conducting a stream of hot gas in one direction through the heating duct to provide a flow of heat outwardly from said heating duct whereby portions of the mass of material located in the crescent shaped passageway are rapidly heated, simultaneously circulating a flow of heated gas around outer supported portions of said adhesive received in the hopper to induce melting inwardly of the mass, confining a quantity of the premelted material in the elongated passageway of crescent shaped cross section to provide a thin laminar body of melted material, sensing changes in temperature in the melted material in the crescent shaped passageway and controlling the said flow of hot gases internally and externally of the crescent shaped passageway in accordance with changes in temperature in said laminar body.

2. Method of heating a thermoplastic material to form a reservoir of a liquified adhesive body suitable for use with an adhesive applicator apparatus, said method including the steps of supporting a mass of said adhesive material within a hopper and around a heating duct supported in close proximity to the bottom of said hopper to form a passageway of crescent shaped cross section, conducting a current of hot gas through the heating duct to produce a flow of heat outwardly of the mass of material from the enclosed space to induce melting, simultaneously circulating a current of heated gas around outer portions of the hopper to provide a flow of heat inwardly of the adhesive material and cause additional melting, confining a quantity of melted material in the crescent shaped restricted passageway to provide a thin laminar heat-sensitive body into which heat flows rapidly from two opposite sides thereof, continuously sensing changes in temperature of the material in the crescent shaped passageway varying the flow of hot gases in accordance with changes in temperature sensed in the laminar body at the bottom of the crescent shaped passageway, and periodically removing portions of the heated material from the bottom of the crescent shaped passageway for use in said applicator apparatus.

3. Apparatus for premelting a thermoplastic material of the hot melt adhesive type and supplying liquified adhesive to a hot melt adhesive applicator, said apparatus including a casing having a heating oven formed therein, a hopper supported in the upper side of the casing and extending downwardly into said oven, said hopper having downwardly converging sides and a curved bottom, a tubular member mounted in the hopper and located in close proximity to the bottom of the hopper to define an elongated restricted passageway of crescent shaped cross section, an outlet member extending downwardly from the bottom of the hopper and communicating with the underside of said crescent shaped restricted passageway, means for circulating heat in said tubular member, and externally of the hopper member, a heat sensing element located in the bottom of said crescent shaped passageway and electromechanical means responsive to changes in temperature registered by said heat sensing element for controlling said heating means.

4. A structure as defined in claim 3, including a metering pump mechanism mounted in the casing below the hopper and constructed and arranged to remove melted material from said restricted passageway.

References Cited by the Examiner

UNITED STATES PATENTS

| | | | |
|---|---|---|---|
| 201,668 | 3/78 | Hardy | 126—368 |
| 738,530 | 9/03 | Dodson | 126—366 X |
| 911,253 | 2/09 | Moore | 222—146 |
| 1,202,976 | 10/16 | Derby | 219—38 |
| 1,664,882 | 4/28 | Hadaway | 263—11 X |
| 2,076,689 | 4/37 | Williams | 126—343.5 |
| 2,122,310 | 6/38 | Burt | 126—368 |
| 2,217,743 | 10/40 | Greenewalt | 18—8 |
| 3,042,481 | 7/62 | Coggeshall | 18—8 |

JAMES W. WESTHAVER, *Primary Examiner.*

JOHN J. CAMBY, *Examiner.*